Oct. 6, 1959  J. C. HAWKINS  2,907,393
APPARATUS FOR REMOVING SOIL FROM HARVESTED PLANTS
Filed June 10, 1957
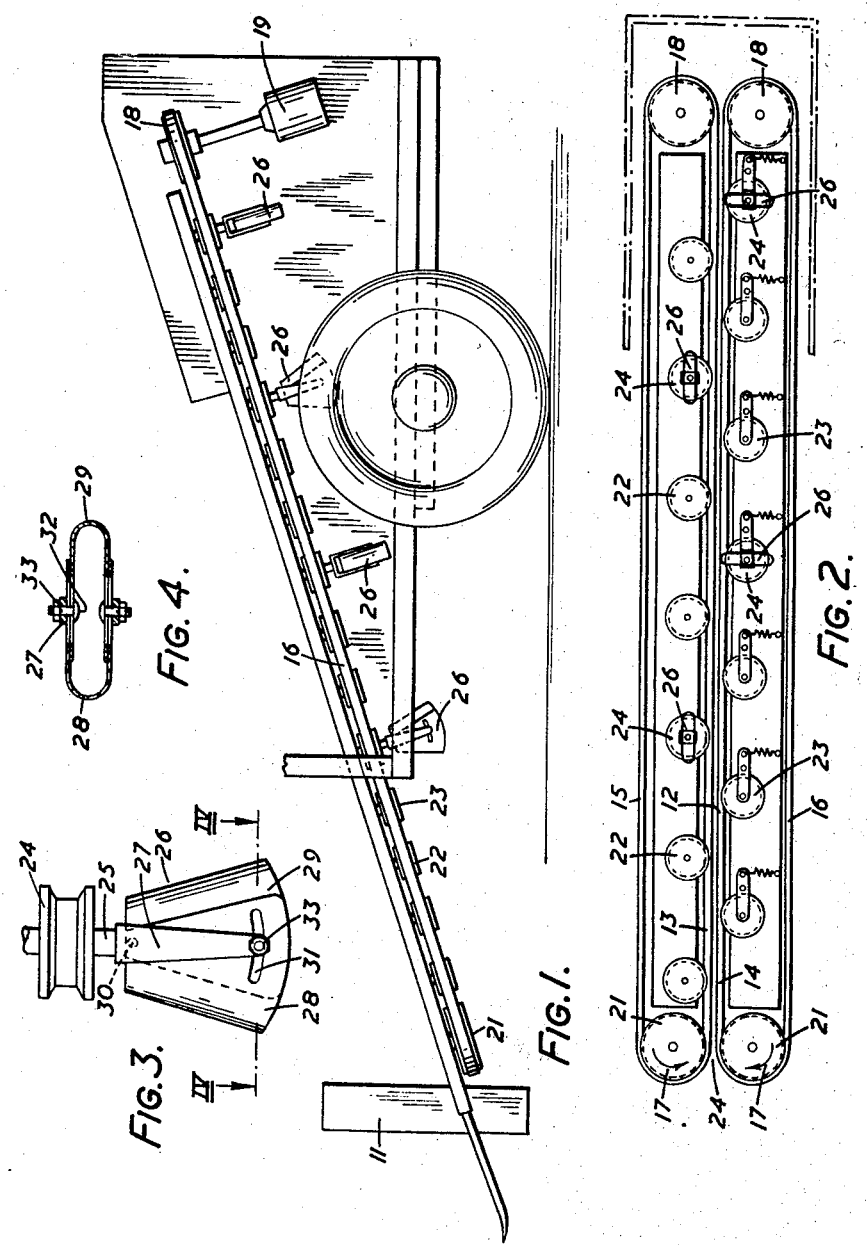
INVENTOR
John C. Hawkins
BY Stevens, Davis, Miller & Mosher
ATTORNEYS

United States Patent Office

2,907,393
Patented Oct. 6, 1959

2,907,393

APPARATUS FOR REMOVING SOIL FROM HARVESTED PLANTS

John Clement Hawkins, Clophill, England, assignor to National Research Development Corporation, London, England, a corporation of Great Britain Application June 10, 1957, Serial No. 664,596

Claims priority, application Great Britain June 14, 1956

3 Claims. (Cl. 171—61)

This invention relates to mechanism for removing soil from harvested crops, for example groundnuts which are frequently harvested by uprooting the whole crop, and either delivering it to a mechanism which carries out a further process on the plants such as the removal of the groundnuts or depositing it in a neat row on the ground.

One object of the present invention is to provide an improved mechanism for removing soil from the plants of such crops without however causing the nuts themselves to be removed to any substantial extent or the plants themselves to be damaged.

In accordance with one aspect of the present invention mechanism for removing soil from harvested plants comprises a conveyor arranged to carry the plants with the crop-carrying parts of the plants dangling, and a beater having a major and minor axis arranged to be rotated as the plants are conveyed and thus to deliver repeated intermittent blows to the dangling parts of the plant. Preferably the axis of rotation of the beater is generally perpendicular to the direction of movement of plants along the conveyor and has a substantial vertical component.

The groundnut plant comprises roots below the ground and foliage above the ground and fibres, known as gynophores, grow out from the top of the plant and droop down and penetrate the ground the nuts growing beneath the surface of the earth on the ends of these hanging fibres. In one method of harvesting the plants are uprooted and the foliage is gripped by a conveyor, which transports the plants to the stripping mechanism the roots and fibres carrying the nuts dangling below the conveyor. It is desirable for as much of the soil clinging to the roots and nuts to be removed from the plants before they reach the stripping mechanism and the present invention provides a suitable method of doing this.

Conveniently the beater includes a rotary shaft carrying one or more radial projections for delivering the blows; the or each radial projection may be in the form of a wing on the shaft.

In one form of the invention the beater comprises a rotary shaft carrying at least one pair of diametrically opposed wings, of which at least one wing is pivotally mounted so that the external shape of the beater is variable.

It will be appreciated that different conditions may require a different rate of delivery of blows, and a different position below the conveyor at which the blows are to be delivered, and the shape of the beater can be designed accordingly, while a variable external shape enables a single beater to be used in different conditions.

In some conditions it has been found that the best shape of the beater is a tapered shape with the greatest diameter in the region of the bottom of the dangling parts of the plants and the least diameter in the region of the point of suspension of the plants.

Rotation of the beater can be effected by means of a pulley carried on it, and if the conveyor comprises a belt this may be arranged to rotate the pulley. In one form of harvester to which the invention is particularly applicable the conveyor comprises two belts between which the plants are to be carried and there are at least two beaters arranged along the belts, alternate beaters being driven by one belt and the other respectively.

The invention also includes a method of removing the soil from the harvested plants in which the plants are carried with the crop-carrying parts of the crop dangling while, as the plants are conveyed, repeated blows are delivered to the dangling parts of the plants by means of one or more beaters rotating about an axis generally perpendicular to the direction of movement of the plants along the conveyor and with a substantial vertical component. The method may be use mechanism as defined above.

The invention may be performed in various ways and one specific embodiment will be described by way of example with reference to the accompanying drawings in which:

Figure 1 is an elevation of a groundnut harvester incorporating mechanism for removing soil from the harvested plants;

Figure 2 is an inverted plan view of the beaters and conveyor of the apparatus shown in Figure 1;

Figure 3 is a detailed view to a larger scale of one of the beaters shown in Figure 1 and;

Figure 4 is a section taken on the line 4—4 of the beater shown in Figure 3.

The general construction of the harvesting machine is described in British patent specifiaction No. 748,547 and as it does not form a part of the subject of the present invention it will not be described here.

It will suffice to say that a share bow 11 removes the crops from the soil and feeds them into a passsage 12 formed between two adjacent sides 13 and 14 of a pair of belts 15 and 16 which rotate in opposite directions as shown by the arrows 17 in Figure 2 by being driven at their ends remote from the share bow 11 by pulleys 18, driven by any convenient mechanism 19 which may for example be driven by the motor of a tractor pulling the harvester.

The belts run around free pulleys 21 at their lower ends and the sides 13 and 14 are held close together on either side of the passage 12 by means of a number of fixed pulleys 22 in contact with the belt 15 and a number of pivotally mounted spring loaded pulleys 23 in contact with the belt 16. Each of the pulleys 22 is opposite a space between adjacent pulleys 23, as can be seen in Figure 2 and as clearly described in British patent specification No. 748,547.

The belts 15 and 16 are inclined upwardly from the share bow 11 and as crops are fed into the convergent inlet 24 they are lifted as they pass along the passage 12 due to the rotation of the belts 15 and 16. Conveniently some form of stripping mechanism may be provided towards the upper end of the conveyor for stripping the nuts from the plants.

It is desirable that as much as possible of the soil that is uprooted with the crops shall be removed from the plants before the nuts are stripped off them without however losing any of the groundnuts themselves. For this purpose certain of the pulleys 22 and 23 (labelled 24 on the drawing) carry rotary beaters 26. The beaters are arranged alternately at one side and the other of the conveyor so that those driven by one belt alternate with those driven by the other.

As will be seen most clearly from Figures 3 and 4 each beater 26 has attached to a pulley 24 a shaft 25 which depends generally at right angles to the plane of the conveyor and carries a fork 27. The striking portion of the beater comprises two hollow sheet metal shells 28 and 29 of uniform thickness and of generally U-section in plan, the distance between arms of the U being substantially constant, while the dimension in the direction parallel to the arms of the U increases from top to bottom. One shell is able to fit within the other and both shells are pivoted at their upper ends to the fork 27 by means of a pin 30. Thus fitted together, the two shells form a beater of generally oblong configuration. A major axis is defined between the opposed ends of the two shells 28 and 29. A minor axis is defined between the sides of the shells 28 and 29. In both sides of both shells towards their lower ends there are co-operating slots 31 and a bolt 32 passes through each co-operating pair of slots and the adjacent leg of the fork 27, and is secured by a nut 33. The slots enable the width across the bottom of the shells to be varied and they can be clamped in any desired position by means of the nuts and bolts 32 and 33.

The pulley 24 is rotated by one or other of the belts 15 and 16 and the shells thus deliver repeated blows to the parts of the plants that dangle below the conveyor.

It is found that the amount and kind of soil that adheres to the plants when they are uprooted may vary widely from place to place, from one time of the season to another and with the weather and it is possible with the type of beater described to vary the weight of the blow delivered by the beater by diminishing or extending the major axis of the beater and the position at which the blow is delivered could be varied by changing the distance of the beater from the pulley. With the type of beater described the size can be gradually varied until trial and error establishes the adjustment at which a maximum of soil is removed without removal of any groundnuts.

What I claim as my invention and desire to secure by Letters Patent is:

1. Apparatus for removing soil from harvested plants having soil-bearing parts and foliage, comprising a frame, conveying means mounted on said frame to engage said foliage and convey said plants with their soil-bearing parts dangling, at least one beater comprising a shaft having a longitudinal axis rotatably supported on said frame and disposed in depending cooperative relation with and substantially normal to said conveying means, at least one rigid wing projecting radially from said shaft, said wing having a major axis and a minor axis, and drive receiving means on said shaft.

2. Apparatus for removing soil from harvested plants having soil-bearing parts and foliage, comprising a frame, conveying means mounted on said frame to engage said foliage and convey said plants with their soil-bearing parts dangling, at least one beater comprising a shaft having a longitudinal axis rotatably supported on said frame and disposed in depending cooperative relation with and substantially normal to said conveying means, said shaft having secured thereto a pair of wings projecting in opposite directions radially from said shaft, each wing comprising a shell of sheet material of U-shaped cross-section in a plane perpendicular to the longitudinal axis of said shaft whereby each shell has two flanks each having inner and outer ends and a connecting portion joining said outer ends, said inner ends lying on each side of and adjacent the longitudinal axis of said shaft and said connecting portion lying remote from the longitudinal axis of said shaft, thereby defining a major axis between said outer ends and a minor axis between said inner ends.

3. Apparatus for removing soil from harvested plants having soil-bearing parts and foliage, as described in claim 2 wherein the inner ends of one shell are slidably engaged between the inner ends of the other shell whereby to provide for the diminishing and extending of the major axis.

References Cited in the file of this patent

UNITED STATES PATENTS

| 1,657,183 | Siemann | Jan. 24, 1928 |
| 2,522,644 | Searcy | Sept. 19, 1950 |
| 2,703,953 | Altemus | Mar. 15, 1955 |
| 2,771,728 | Mason | Nov. 27, 1956 |